United States Patent Office 2,798,477
Patented July 9, 1957

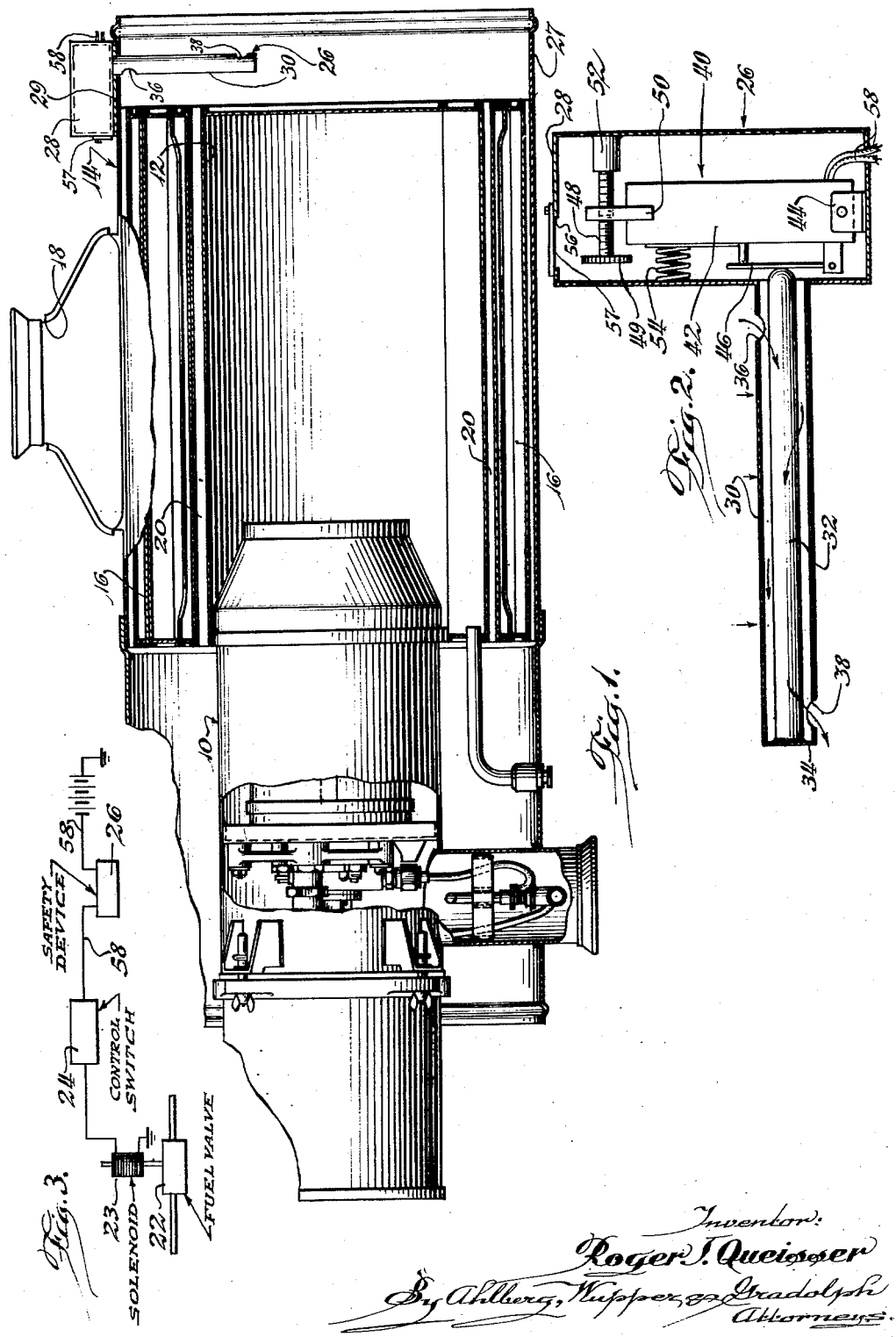

2,798,477

HOT AIR HEATER WITH OVERHEAT SAFETY DEVICE

Roger J. Queisser, Indianapolis, Ind., assignor to Stewart-Warner Corporation, Chicago, Ill., a corporation of Virginia Application August 12, 1954, Serial No. 449,349

2 Claims. (Cl. 126—116)

The present invention relates to an improved safety device for preventing overheating of combustion heaters, such as those used in aircraft.

Aircraft combustion heaters are designed to operate at very high temperatures. Because of this and the possibility of operational irregularities, there is a danger of overheating. Materials ordinarily used in aircraft heaters will not satisfactorily withstand operating temperatures substantially above 1500° F.

One object of the invention is to protect a combustion heater from overheating by means of an improved safety control device sensitive to radiant heat which is self-compensating for changes in the ambient temperature of the switch to respond accurately to an increase in the temperature of the adjacent heater structure above a predetermined critical value.

Another object is to provide an easily calibrated control device of this character, formed of a simple, economical construction which has a long, dependable service life.

Other objects and advantages will become apparent from the following description of the form of the invention illustrated in the drawing, in which:

Figure 1 is a side view, largely in longitudinal section, showing an aircraft heater incorporating the invention;

Fig. 2 is a longitudinal sectional view on an enlarged scale of the safety switch provided by the invention; and Fig. 3 is a diagrammatic illustration of a simplified heater control circuit incorporating the safety device.

For the purpose of illustration, the invention is shown as incorporated into the aircraft type combustion heater disclosed in U. S. Patent No. 2,531,939, issued November 28, 1950, to Gerald Jacobs. In general, the heater comprises a burner assembly 10 which discharges hot combustion gases into a central chamber 12 in a lightweight heat exchanger 14. From the chamber 12 the hot gases flow through passageways 16 to an exhaust outlet 18. Ventilating air to be heated is admitted at the left end of the heater (Fig. 1) to flow through annular passageways 20 extending through the heat exchanger around the chamber 12 and the hot gas passageways 16. At each end of the chamber 12 the passageways 20 merge together to form a common passageway of larger size for the air being heated. In some installations ventilating air flows through the heat exchanger 14 in the opposite direction, from right to left with reference to Fig. 1.

The burner 10 is operated intermittently by an electrical control system, which for the purpose of discussion may include, as shown diagrammatically in Fig. 3, a fuel cutoff valve 22 operated by a solenoid 23 and controlled by a thermostatic switch 24 suitably positioned on the heater to respond to the temperature of the ventilating air heated in the exchanger 14. Ordinarily the switch 24 operates to open the fuel valve 22 when the temperature of the heated ventilating air drops below a first predetermined value and to close the valve when the air temperature rises to a predetermined higher value.

Overheating of the heater structure due to operational irregularities or other causes is avoided by the use of an improved safety control device 26 to interrupt operation of the burner 10 when the temperature of the heater structure reaches a maximum value consistent with a satisfactory service life.

Preferably the control 26 is mounted on a portion of the outer casing 27, the heat exchanger 14 extending somewhat beyond the right end of the hot gas structure within the exchanger (Fig. 1). The control 26 comprises a casing 28 supported by a plate 29 or the like on the outside of the heat exchanger casing 27. A thin walled, cylindrical shielding barrel 30 fixed at one end to the casing 28 extends radially through the heat exchanger casing 27 into the space or passage for ventilating air just to the right of structure forming the hot gas chamber 12 and passageways 16. Thus mounted, the barrel 30 forms an efficient collector of radiant heat from the structure defining the chamber 12.

A cylindrical rod 32, having a diameter substantially less than the inside diameter of the barrel 30, is mounted centrally within the barrel by a disc 34 brazed or otherwise secured to the outer ends of both the barrel and rod. The inner end of the rod 32 extends a short distance into the casing 28. The rod 32 and barrel 30 are made from the same structural material, preferably a metal having a substantial coefficient of thermal expansion.

A ventilating aperture 36 is formed in the upstream side of the barrel 30 with reference to the flow of ventilating air around the barrel. (The airflow is indicated by arrows in Fig. 2.) Air entering the aperture 36, which is located near the casing 28, passes longitudinally through the barrel 30 and flows out through a downstream aperture 38 formed in the opposite end of the barrel. This flow of air around the rod 32 heats and cools the rod whereby the rod expands and contracts to compensate for changes in the ambient temperature of the surrounding barrel 30. The number and location of the ventilating apertures 36, 38 in the barrel 30 can be varied as necessary to provide proper ventilation through the barrel in different heater installations.

A snap switch 40 of conventional construction is mounted in the casing 28 for operation by the differential elongation and contraction of the barrel 30 and rod 32, Fig. 2. The elongated body 42 of the switch 40 is pivoted to an internal bracket 44 on the casing 28 to swing toward and away from the rod 32. The inner end of the rod 32 engages an operating lever 46 on the switch 40.

A calibrating screw 48 threaded into a bracket 50 on the free end of the switch body 42 bears on an internal boss 52 on the casing 28 to adjust the position of the switch 40 in relation to the rod 32 by working against a spring 54 interposed between the switch body and the side of the casing opposite the boss. A serrated head 49 on the screw 48 is accessible through an opening 56 in the casing 28 normally closed by a cover 57.

Electrical leads 58 from the snap switch 40 are interconnected with the electrical control system for the burner 10. As shown in Fig. 3, the control device 26 is connected in series with the thermostatic control switch 24 for the fuel valve 22.

Operation of the burner 10 sharply increases the temperature of the heat exchanger 14 and raises the temperature of the ventilating air flowing past the barrel 30 of the control device 26. The barrel 30 is elongated by heat absorbed from the passing ventilating air and also by radiant heat emitted from the adjacent structure of the heat exchanger. At the same time the heated air passing through the barrel 30 elongates the rod 32 to compensate for elongation of the barrel by heat absorbed from the surrounding air. The rod 32 is shielded from radiant heat by the barrel 30. Hence, the movement of the inner end of the rod 32 in relation to the casing 28 attached to the barrel 30 is substantially equal to the elongation of the barrel by radiant heat, which is a good measure of the temperature of the adjacent heater structure.

When the temperature of the adjacent heater structure reaches a critical value, above which damage might occur, the switch 40 of the safety device 26 operates to interrupt the supply of fuel to the burner 10. As the temperature of the heat exchanger drops, the barrel 30 and the rod 32 are both quickly cooled by the passing flow of ventilating air.

The safety control device thus provided is self-compensating for changes in the ambient temperature to respond accurately to the temperature of the heater structure spaced somewhat from the device itself. Moreover, the control device remains relatively cool as compared to the temperature of the heater structure. The switch 40 is located outside of the heater structure.

The overall construction of the control device, including the barrel 30 and the compensating rod 32, is quite simple. The length of the barrel 30 exposed to radiant heat is sufficient to provide a considerable range of movement of the inner end of the actuating rod 32. This avoids the need for extreme precision in the construction of the control and at the same time assures accuracy of operation.

A simple adjustment of the calibrating screw 48 is all that is necessary to calibrate the control device 26 for use in different heater installations. Hence, the control device can be mounted in the ventilating air stream at either the upstream or downstream side of hot heat exchanger passages and calibrated to respond accurately to the temperature of the adjacent heater structure.

While I have shown and described a preferred embodiment of my invention, it will be apparent that variations and modifications thereof may be made without departing from the principles and scope of the invention. I therefore desire, by the following claims, to include all such variations and modifications by which substantially the results of my invention may be obtained through the use of substantially the same or equivalent means.

I claim:

1. A vehicle heater adapted for high capacity operation without overheating and comprising, in combination, a heat exchanger having means defining a chamber for hot combustion gases and means defining a passageway adjacent said chamber means for air to be heated by heat from said chamber means, a burner interconnected with said chamber means to discharge into said chamber, an electrical control connected to control said burner, a substantially straight elongated radiant heat collector of hollow tubular construction extending into said passageway in spaced exposed relation to said chamber means to receive radiant heat from the latter, means supporting said tubular heat collector at one location along the length thereof for free thermal elongation and contraction, a straight elongated ambient temperature compensating member substantially coextensive lengthwise with said tubular heat collector and having a coefficient of thermal expansion substantially equal to that of said collector, said temperature compensating member being disposed within said tubular collector in radially spaced relation thereto, means connecting one end of said temperature compensating member to the adjacent end of said tubular collector, said collector defining a plurality of axially spaced openings therein located within said heater passageway to receive and circulate through the collector around said temperature compensating member a portion of the air blowing through the passageway around the medial portion of said collector, a control switch connected to said electrical burner control and mounted at the end of said collector opposite the connection thereto of said temperature compensating member, and means connecting said switch to the adjacent ends of both said tubular collector and said temperature compensating member for operation by differential elongation and contraction of said collector and said temperature compensating member.

2. A vehicle heater adapted for high capacity operation without overheating and comprising, in combination, means defining a chamber for hot combustion gases, means defining a passageway adjacent said combustion chamber for air to be heated by said chamber means, a burner connected to said chamber means to discharge into said chamber, an electrical control connected to control said burner, a switch casing mounted on said passageway means, a control switch mounted in said switch casing and connected electrically with said electrical burner control, a substantially straight elongated radiant heat collector of hollow tubular construction having one end located adjacent said switch casing and projecting therefrom into said passageway in spaced exposed relation to said chamber means for free thermal elongation and contraction, a straight elongated ambient temperature compensating member substantially coextensive in length with said tubular collector and having a coefficient of thermal expansion substantially equal to that of the collector, said temperature compensating member being disposed within said collector in radially spaced relation thereto, said radiant heat collector defining air circulating apertures opening into the collector from the passageway and out of the collector in axially spaced relation along the collector to circulate moving air from the passageway through the collector and around said ambient temperature compensating member, said air circulating apertures being limited in size and number to have a total area limited to an inconsequential fraction of the surface area of said collector which shields said compensating member from radiant heat, means connecting the end of said compensating member remote from said switch casing to the adjacent end of said collector, means interconnecting said switch with the adjacent ends of both said collector and said temperature compensating member to operate said switch in response to differential elongation and contraction of said collector and said compensating member, and said means interconnecting said switch with the adjacent ends of said collector and said temperature compensating member including means for adjusting the extent of differential elongation of said collector and said compensating member required to operate said switch.

References Cited in the file of this patent

UNITED STATES PATENTS

| | | |
|---|---|---|
| 2,185,436 | Gordon | Jan. 2, 1940 |
| 2,254,481 | Harris | Sept. 2, 1941 |
| 2,392,065 | Rodgers | Jan. 1 1946 |
| 2,494,660 | Kathe | Jan. 17, 1950 |
| 2,545,616 | Heymann | Mar. 20, 1951 |
| 2,598,808 | Ledin | June 3, 1952 |
| 2,705,746 | Strange | Apr. 5, 1955 |
| 2,719,198 | Cunningham | Sept. 27, 1955 |